Jan. 2, 1968   B. BASSAN   3,361,490
SHAFT FEEDTHROUGH APPARATUS FOR VACUUM COATERS
Filed May 13, 1965
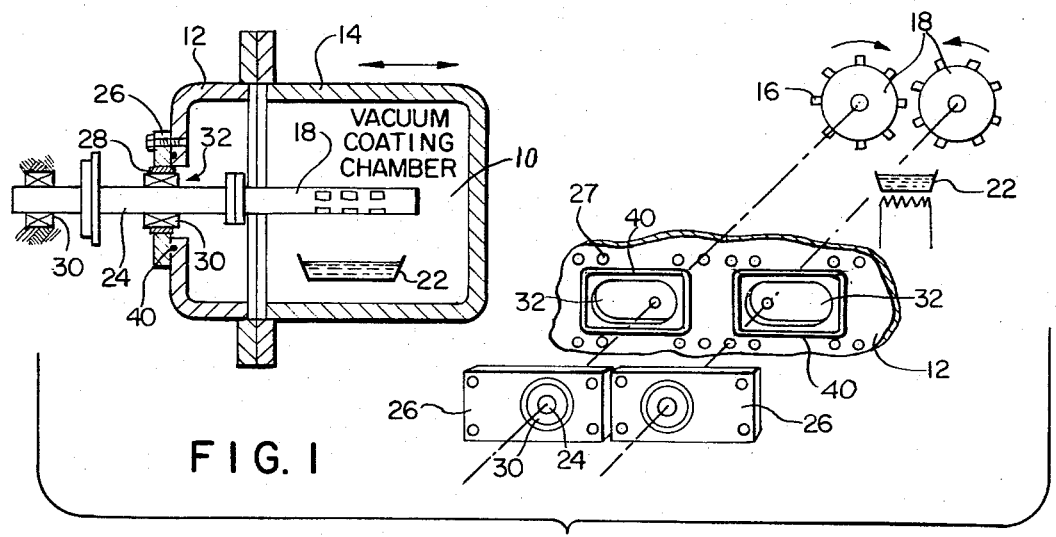
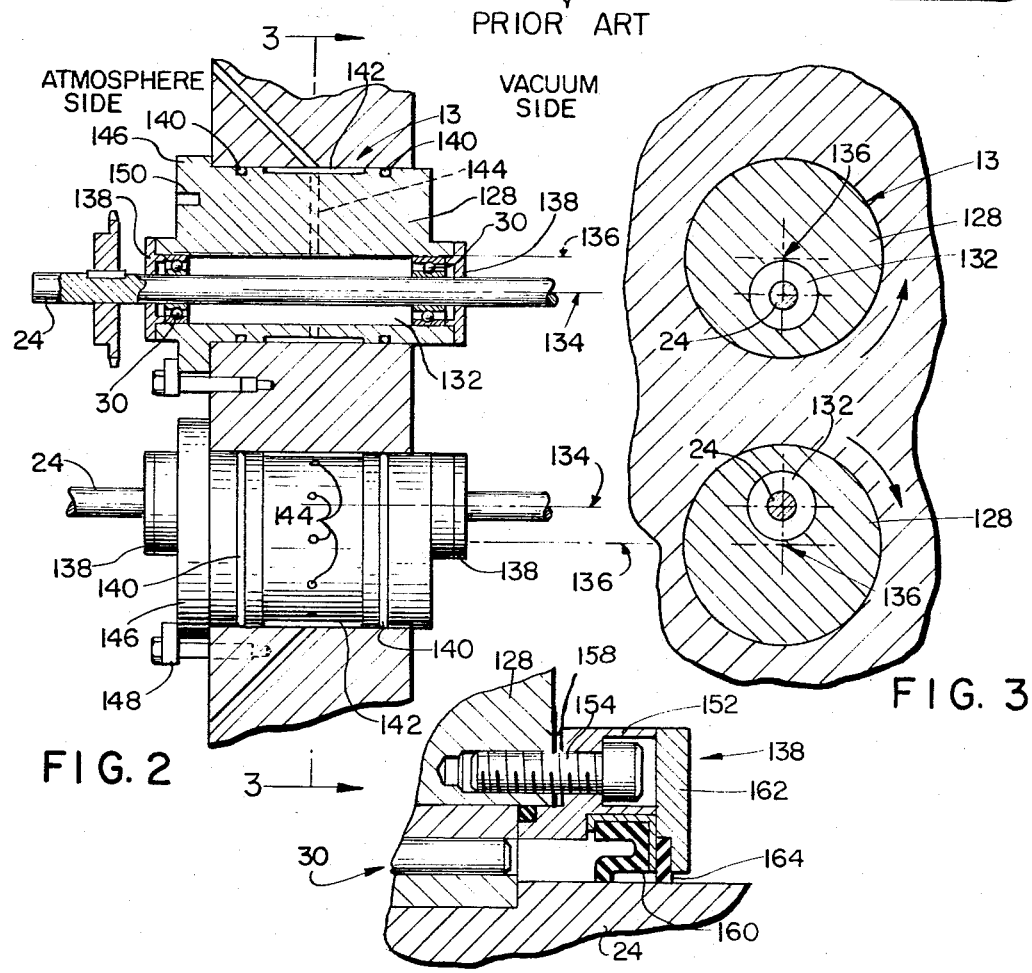

United States Patent Office 3,361,490
Patented Jan. 2, 1968

3,361,490
SHAFT FEEDTHROUGH APPARATUS FOR VACUUM COATERS
Benjamin Bassan, Framingham, Mass., assignor to National Research Corporation, Cambridge, Mass., a corporation of Massachusetts
Filed May 13, 1965, Ser. No. 455,467
6 Claims. (Cl. 308—15)

ABSTRACT OF THE DISCLOSURE

A vacuum coater apparatus with two rotary shaft feedthroughs in the wall having eccentrically mounted bearings to allow for adjustment of the spacing between shafts.

---

The present invention relates to motion transmitting feedthroughs for high vacuum apparatus and particularly to apparatus for transmitting rotary motion through a wall of a vacuum coater.

It is the principal object of this invention to provide improved shaft feedthroughs which are easily adjustable to change the relative positions of the shaft within the coating chamber.

It is a further object of the invention to provide an adjustable rotary shaft feedthrough affording improved vacuum-tight sealing across the feedthrough.

It is a further object of the invention to proveid an adjustable rotary shaft feedthrough affording improved stress transmission between the shaft and vacuum chamber wall.

It is a further object of the invention to provide adjustability of vacuum coater feedthroughs with less expense and greater design flexibility and reliability than in prior art devices.

These objects are accomplished by feedthrough apparatus which has the form of circular section bearing housing blocks slidably supported in openings in the coater wall. Shafts and bearings are supported in the blocks so that they are parallel to and offset from the block axes. Then the bearing housing blocks are rotatable to easily adjust the relative shaft positions. This affords the advantages of ease of adjustment and low cost compared to prior art devices. The additional advantage is afforded that the loads due to the shafts are taken up radially around the peripheral surfaces of the blocks and uniformly distributed. In order to make this construction possible in light of the problem of vacuum requirements, I provide a novel sealing and lubricating arrangement. The large gaskets of prior art devices are replaced by simple O-rings with smaller sealing area exposed to the vacuum zone. This arrangement, in combination with the above adjustable blocks, provides a good seal across the feedthrough and is sufficiently flexible to accommodate a wide variety of shaft requirements. Two adjacent bearing housing blocks can provide shaft spacing (center-to-center) which is variable between a minimum spacing slightly greater than one shaft diameter and a maximum spacing slightly less than two block diameters.

My invention accordingly comprises improved feedthrough apparatus for vacuum coaters and the like including the construction, combination of parts, and the arrangement of parts with respect to each other as described herein or shown in the accompanying drawing and the full scope of application of which is set forth in the claims.

Other objects, features and advantages of my invention will in part be obvious and will in part appear hereinafter.

For a fuller explanation, my invention is now set forth in terms of the best mode of use known to me which is described with reference to the accompanying drawings wherein:

FIG. 1 is a schematic diagram of a prior art vacuum coater and its principal feedthroughs thus showing the context of my preferred embodiment;

FIG. 2 is a diagrammatic, partly sectional view of a portion of a vacuum coater with feedthrough apparatus arranged according to the preferred embodiment of my invention:

FIG. 3 is a cross-sectional view taken at right angles with respect to FIG. 2; and FIG. 4 is a sectional detail of a sealing element used in FIG. 2.

Referring now to FIG. 1, there is shown a typical vacuum coating chamber 10 which comprises wall portions 12 and 14. When the portions are moved together they form a hermetically sealed chamber (except for ports connected to vacuum pumps). Within the chamber substrates 16 are mounted on rotating members 18. As the members 18 rotate, a metal source 22 is heated to evaporate metal vapors against the substrates.

The members 18 are mounted on shafts 24. One or more of these shafts passes through the wall 12 for connection to driving or braking means or the like. Each feedthrough comprises a mounting flange 26 bolted to the fixed wall 12 of the chamber. The flange carries a sleeve 28 which supports a bearing 30 and the shaft 24. An additional bearing 30 is mounted on fixed structure outside the chamber so that the shaft 24 can support a cantilever load (member 18) within the chamber.

It is often necessary to change the relative positions of members 18 and consequently of shafts 24, between coating runs. Depending on the nature of the substrate(s) and/or the coating source to be used in the next run, it may be necessary to move the rollers close together or apart. To this end, the wall 12 has long grooves 32 through which the shafts 24 pass. The shafts 24 can be arranged in the rear ends of their respective grooves (as shown in FIG. 1) or in the far ends of their grooves or in intermediate positions. The flanges 26 are moved to the left and right to change the shaft positions. A series of bolt holes 27 are provided in wall 12 to accommodate plates 26 in several lateral positions. Bolting is considerable because the bolts take the full load of rotating shaft stresses. A vacuum coater has the special requirement that in any of the above arrangements the hermetic sealing of the chamber must be preserved. A rubber gasket 40 is mounted in the wall 12 around each groove 32. The flanges 26 must be long enough so that when they are moved to change the relative positioning of shafts 24 they (the flanges) are always pressing against the gaskets 40 to maintain the vacuum seal. This presents a limit to how close the shafts can be arranged with respect to each other and also limits the maximum size of the shafts. In this art, it is often necessary to use large hollow shafts with pipes, wires, etc. inside the shaft. Another major difficulty of the prior art system is that each time the position of a shaft is changed its fixed bearing must be moved and this involves considerable effort, including a careful realignment.

Referring to FIG. 2, the shaft arrangement is shown for a vacuum coater made according to the present invention. Where parts similar to those of FIG. 1 are used, they are indicated by the same reference numerals. Where different parts are used, they have a number which is 100 plus the number of the most nearly analogous part from FIG. 1; e.g., bearing housing block 128 according to my invention vs. mounting sleeve 28 of FIG. 1.

According to my invention one or more of the shafts is mounted in a bearing housing member 128. The bearing housing member may be a forging or machined piece or otherwise constructed. The bearing housing member is circular in cross-section and contains a bore 132. The axis 134 of the bore is parallel to and offset from the central axis 136 of the bearing housing block. The shafts 24 and bearings 30 are mounted in the bore. The block 128 is made long enough so that it runs the full length of opening 13 and the bearings 30 are axially spaced in the bore 132 so that they essentially straddle the opening 13.

Annular sealing ring assemblies 138 (described below) are mounted at the ends of the bore 132 to provide a vacuum seal across the bore. The clearance of the block 128 within bore 13 is less than about .005 inch and this clearance is sealed by a pair of rubbery O-rings 140. An annular groove 142 and radial passages 144 are provided in each bearing housing member for circulating lubricating oil to the shaft and bearings. The oil aids the sealing action of the rings 140 and of the assemblies 138 of the openings 13 and 132, respectively. Each block is provided with an integral flange 146 which is held by clamp 148 to prevent axial movement. The exterior surface of the block may also be notched at the point(s) where the clamp presses against it so that the clamp prevents rotary sliding of the block 128 while the shaft 24 is rotating. However, the tendency to rotate is minimal and the axial pressure of the clamp can prevent this even without notches. In some instances, the clamps may be dispensed with and internal friction due to the O-ring gaskets will prevent accidental rotation of the bearing housing member.

Referring now to FIGS. 2 and 3, the operation of my invention can be easily visualized. At the end of a coating run, it may be desirable to change the spacing of the two shafts 24 in preparation for the next run. The operator loosens the clamps 148 and inserts wrenches into holes 150 provided in the face of each block to rotate the blocks about their axes 136. The operator rotates the blocks as indicated by the arrows in FIG. 3 to increase the spacing between shafts. If desired, only one block can be rotated or the blocks can be rotated through different angles. The clamps are then refastened and the shaft feedthroughs are ready for the next coating operation.

Referring now to FIG. 4, a portion sealing assembly 138 is shown in more detail. The assembly comprises an annular cover 152 secured to the face of block 128 by bolts 154. The cover has a step-form relief 158 to accommodate an O-ring at its inner end and to provide flexibility in the axial positioning of the cover. The fixed outer case of bearing 30 cooperates with the inner end of annular cover 152 to provide an annular groove for an O-ring. Even if bearing 30 were located to the left of the position shown in FIG. 4, the relief 158 would allow cover 152 to be moved to the left to follow it. A conventional Garlock type seal 160 is mounted from the cover and an annular cap 162 and guard ring 164 provide a back-up to separate the seal from the exterior (atmosphere or vacuum side).

A sleeve (not shown) is provided in bore 132 to space bearings 30, and the sleeve together with the bolted on covers 152 prevents axial sliding of the bearings.

One of the advantages of my invention is that the spacing of shafts can also be done while the chamber is under a vacuum. The operator loosens the clamp and rotates the bearing housing member. The lubrication fluid helps in accomplishing this rotation and prevents substantial in-leakage of air past the two O-rings. This operation would be impossible in the above-described prior art arrangement. Also, the loading due to the pressure differential across the bearing housing member does not affect the O-ring during rotation of the bearing housing.

Certain changes can be made in the above apparatus without departing from the scope of the invention herein involved. For instance, the shafts within the bearing housing member could be skewed for some applications by changing the bearing construction or bore axis. The single block bearing housing member of the preferred embodiment could be replaced by a circular plate with an orifice offset from the center of the disk and which is welded to an outer cylindrical tube which provides the exterior surface and an inner tube which provides the bore. It is therefore intended that the matter contained in the above description shall be read as illustrative and not in a limiting sense.

What is claimed is:

1. In a vacuum coating machine, or the like, comprising a hermetically sealed chamber formed of walls and two spaced, parallel shafts passing through a common wall of said chamber and feedthrough apparatus supporting the said shafts and being adjustable for changing the relative spacing of the shafts, an improved shaft/feedthrough subcombination comprising in combination:
   (a) first and second adjacent openings in said wall, each of said openings having a circular inner surface centered about an opening axis;
   (b) first and second bearing housing members arranged in said first and second wall openings, respectively, the bearing housing members having circular exterior surfaces essentially conforming to the said inner surfaces of the wall openings, the bearing housing members having central axes coinciding with the said opening axes,
   (c) means providing a bore in each of the bearing housing members, the bores extending from the exterior of the chamber at one end of the bore to the interior of the chamber at the other end of the bore and each of said bores having a central axis which is offset from the central axis of its associated bearing housing member;
   (d) first and second rotary shafts mounted in the bores of said first and second bearing housing members;
   (e) a pair of spaced bearings mounted at the ends of each of said bores and supporting the shaft therein;
   (f) a pair of spaced O-ring gaskets mounted on the said exterior surface of each bearing housing member;
   (g) means providing lubrication passages within each of said bearing housing members to place in communication the space between the gaskets and the space between the bearings; and
   (h) means for preventing lubricant fluid from entering the chamber.

2. The apparatus of claim 1 wherein said means (h) comprises a sliding seal mounted on each of said bearing housing members at the inner end of the bore and covering the bearing located at said inner end.

3. In combination, a hermetically sealed chamber formed of walls, two spaced, parallel shafts passing through a common wall of said hermetically sealed chamber and feedthrough means supporting said shafts and being adjustable for changing the relative spacing of the shafts said feedthrough means comprising, in combination, first and second circular openings in said wall, first and second bearing housing members slidably mounted in said first and second openings, respectively, the bearing housing members having circular cross sections conforming essentially to their associated openings and having central axes coincident with the axes of the openings, a bore within each bearing housing member having a central axis parallel to and offset from the axis of the bearing housing member shafts extending through the bearing housing members respectively, bearing means mounted on said bearing housing members and supporting said shafts, rubbery O-ring gaskets mounted on the exterior surfaces of the bearing housing members between the bearing housing members and openings to provide a vacuum seal.

4. The apparatus of claim 3 wherein there are two of said O-rings spaced along the outer wall of each bearing housing member and two bearings mounted on each bearing housing member and spaced along the shaft, and lubrication passage means in said wall and in said bearing housing member, the passages having entrances on the outer wall of each bearing housing member between the O-rings and in the bore of each bearing housing member between the bearings, the interface between the opening and bearing housing member being relieved to provide an annular passage for lubricant, whereby lubricant fluid is available for vacuum sealing as well as lubrication of the bearings.

5. The apparatus of claim 4 wherein each bearing housing member comprises annular cover plates mounted at each end of the bore with a sliding seal for the shaft.

6. In combination, a hermetically sealed chamber formed of walls, a shaft passing through a wall of said chamber and feedthrough means comprising in combination a circular opening in said wall having an axis essentially perpendicular to the wall, a bearing housing member slidably mounted in said opening and having a circular exterior surface essentially conforming to the inner surface of said opening, said exterior circular surface having an axis coincident with said opening axis, the exterior surface of said member having a length substantially equal to and abutting the inner surface of said wall opening, the bearing housing member having a bore with inner and outer ends of the bore exposed to the prevailing pressures within the chamber and outside the chamber respectively, the bore having an axis parallel to and offset from the said axis of the wall opening, a pair of spaced O-ring gaskets mounted on the said exterior surface of the bearing housing member, a pair of spaced bearings mounted in said bore, lubrication passages in said bearing housing member, said passages connecting the space between said gaskets and the space between said bearings, said shaft being mounted in said bore and supported by said bearings and means for confining lubricant fluid admitted to the space between the passages so that it does not enter the chamber.

References Cited

UNITED STATES PATENTS

| 1,132,572 | 3/1915 | Frink | 308—62 X |
| 1,198,869 | 9/1916 | Pierce | 308—62 X |
| 1,227,774 | 5/1917 | Friess | 308—72 X |
| 1,452,098 | 4/1923 | Short | 308—62 |

FOREIGN PATENTS

| 981,329 | 1/1965 | Great Britain. |

MARTIN P. SCHWADRON, *Primary Examiner.*

R. F. HESS, *Assistant Examiner.*